(12) United States Patent
Kojima

(10) Patent No.: US 10,549,644 B2
(45) Date of Patent: Feb. 4, 2020

(54) SERVER AND CHARGING SYSTEM

(71) Applicant: Toyota Jidosha Kabushiki Kaisha, Toyota-shi Aichi-ken (JP)

(72) Inventor: Koichi Kojima, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 24 days.

(21) Appl. No.: 15/921,080

(22) Filed: Mar. 14, 2018

(65) Prior Publication Data

US 2018/0272881 A1 Sep. 27, 2018

(30) Foreign Application Priority Data

Mar. 21, 2017 (JP) ................. 2017-054360

(51) Int. Cl.
| | | |
|---|---|---|
| B60L 53/00 | (2019.01) | |
| B60L 11/18 | (2006.01) | |
| H02J 7/02 | (2016.01) | |
| B60L 53/63 | (2019.01) | |
| B60L 53/30 | (2019.01) | |
| B60L 53/31 | (2019.01) | |
| B60L 53/60 | (2019.01) | |
| B60L 53/68 | (2019.01) | |
| G05B 19/042 | (2006.01) | |

(52) U.S. Cl.
CPC ......... B60L 11/1825 (2013.01); B60L 53/305 (2019.02); B60L 53/31 (2019.02); B60L 53/60 (2019.02); B60L 53/63 (2019.02); B60L 53/68 (2019.02); G05B 19/042 (2013.01); H02J 7/02 (2013.01); *G05B 2219/2639* (2013.01)

(58) Field of Classification Search
None
See application file for complete search history.

(56) References Cited

U.S. PATENT DOCUMENTS

| | | | |
|---|---|---|---|
| 2012/0086397 A1 | 4/2012 | Obayashi et al. | |
| 2013/0020993 A1 | 1/2013 | Taddeo et al. | |
| 2013/0049677 A1* | 2/2013 | Bouman | B60L 1/003 320/106 |
| 2014/0247019 A1 | 9/2014 | Park | |
| 2015/0149221 A1* | 5/2015 | Tremblay | B60L 11/1846 705/5 |
| 2015/0306969 A1* | 10/2015 | Sabripour | G06Q 30/00 320/109 |

FOREIGN PATENT DOCUMENTS

| | | |
|---|---|---|
| JP | 2012110122 A | 6/2012 |
| KR | 10-2014-0058864 A | 5/2014 |
| KR | 10-2014-0108987 A | 9/2014 |

* cited by examiner

*Primary Examiner* — Paul B Yanchus, III
(74) *Attorney, Agent, or Firm* — Dinsmore & Shohl LLP

(57) ABSTRACT

A server that receives an instruction related to timer charging in a vehicle from a user includes a communication device and a controller. The instruction from the user includes first data needed for determining a time schedule and second data indicating which one of alternating current charging and direct current charging is performed. The controller is configured to control the communication device to transmit the first data to the vehicle when the second data indicates the alternating current charging, and control the communication device to transmit the first data to a direct current electric power supply facility when the second data indicates the direct current charging.

10 Claims, 12 Drawing Sheets

SERVER AND CHARGING SYSTEM

CROSS-REFERENCE TO RELATED APPLICATIONS

This application claims priority to Japanese Patent Application No. 2017-054360 filed on Mar. 21, 2017, which is incorporated herein by reference in its entirety including the specification, drawings and abstract.

BACKGROUND

1. Technical Field

The present disclosure relates to a server and a charging system.

2. Description of Related Art

A charging system that includes a vehicle and a server configured to communicate with the vehicle is disclosed in Japanese Unexamined Patent Application Publication No. 2012-110122 (JP 2012-110122 A). In the charging system, the vehicle enables timer charging in which charging of a vehicle-mounted electric power storage device using electric power supplied from an electric power supply outside the vehicle (hereinafter, referred to as "external charging") is executed in accordance with a set time schedule. A user can set the time schedule in timer charging by operating a communication terminal such as a mobile phone or a smartphone.

SUMMARY

Types of external charging include alternating current (AC) charging and direct current (DC) charging. AC charging is external charging that uses alternating current electric power supplied from an electric power supply facility (electric power supply) outside a vehicle. For example, in AC charging, the alternating current electric power supplied from the electric power supply facility is converted into direct current electric power by a charger in the vehicle. DC charging is external charging that uses direct current electric power supplied from an electric power supply facility outside the vehicle. For example, in DC charging, alternating current electric power that is supplied from an electric power supply outside the electric power supply facility is converted into direct current electric power by a charger in the electric power supply facility.

AC charging can be started by a control device that controls the charger in the vehicle on the vehicle side. DC charging can be started by a control device that controls the charger in the electric power supply facility on the electric power supply facility side. That is, when timer charging is performed, the location (in the vehicle or in the electric power supply facility) of the control device that should be started in accordance with a time schedule is different between AC charging and DC charging. Thus, a method of realizing timer charging is different between AC charging and DC charging. However, such a point is not disclosed in JP 2012-110122 A.

The present disclosure provides a server that can realize both timer charging based on AC charging and timer charging based on DC charging in a vehicle, and a charging system that includes the server.

A first aspect of the present disclosure relates to a server configured to receive an instruction related to timer charging in a vehicle from a user. The server includes a communication device configured to communicate with the vehicle and a direct current (DC) electric power supply facility as an electric power supply, and a controller configured to control the communication device. The timer charging is external charging that is executed in accordance with a time schedule. The external charging is charging of a vehicle-mounted electric power storage device using electric power supplied from an electric power supply outside the vehicle. The vehicle is configured to enable both of alternating current (AC) charging that is the external charging using alternating current electric power supplied from an AC electric power supply facility as the electric power supply, and DC charging that is the external charging using direct current electric power supplied from the DC electric power supply facility. The instruction from the user includes first data needed for determining the time schedule and second data indicating which one of the AC charging and the DC charging is performed. The controller is configured to control the communication device to transmit the first data to the vehicle when the second data indicates the AC charging, and control the communication device to transmit the first data to the DC electric power supply facility when the second data indicates the DC charging.

In the server according to the first aspect of the present disclosure, the communication device may be configured to communicate with a communication terminal into which the user inputs the instruction, and the server may be configured to receive both of the first data and the second data from the communication terminal.

In the server according to the first aspect of the present disclosure, the communication device may be configured to communicate with a communication terminal into which the user inputs the instruction, and the server may be configured to receive the first data from the communication terminal, and receive the second data from the vehicle.

The server according to the first aspect of the present disclosure may further include a storage device in which a vehicle identification (ID) and a DC electric power supply facility identification (ID) are registered in association with each other.

In the server according to the first aspect of the present disclosure, the first data may include the vehicle ID and an expected departure time, and the controller may be configured to transmit the expected departure time to the DC electric power supply facility registered in association with the vehicle ID when the second data indicates the DC charging.

A second aspect of the present disclosure relates to a charging system including a vehicle, a direct current (DC) electric power supply facility, and a server. The DC electric power supply facility is configured to supply direct current electric power to the vehicle. The server is configured to receive an instruction related to timer charging in the vehicle from a user. The server includes a communication device configured to communicate with the vehicle and the DC electric power supply facility, and a controller configured to control the communication device. The timer charging is external charging that is executed in accordance with a time schedule. The external charging is charging of a vehicle-mounted electric power storage device using electric power supplied from an electric power supply outside the vehicle. The vehicle is configured to enable both of alternating current (AC) charging that is the external charging using alternating current electric power supplied from an AC electric power supply facility as the electric power supply, and DC charging that is the external charging using direct current electric power supplied from the DC electric power supply facility. The instruction from the user includes first data needed for determining the time schedule and second data indicating which one of the AC charging and the DC charging is performed. The controller of the server is configured to control the communication device to transmit the first data to the vehicle when the second data indicates the AC charging, and control the communication device to transmit the first data to the DC electric power supply facility when the second data indicates the DC charging.

In the charging system according to the second aspect of the present disclosure, the communication device may be configured to communicate with a communication terminal into which the user inputs the instruction. The server may be configured to receive both of the first data and the second data from the communication terminal.

According to the second aspect of the present disclosure, appropriate timer charging can be realized by the user inputting needed information into the communication terminal.

In the charging system according to the second aspect of the present disclosure, the communication device may be configured to communicate with a communication terminal into which the user inputs the instruction. The server may be configured to receive the first data from the communication terminal and receive the second data from the vehicle.

For example, the vehicle can recognize which one of the AC charging and the DC charging is performed by detecting connection of either a charging connector for the AC charging or a charging connector for the DC charging to the vehicle. According to the second aspect of the present disclosure, the second data is transmitted to the server from the vehicle. Thus, appropriate timer charging can be realized without the user providing input as to whether to perform the AC charging or the DC charging into the communication terminal.

In the charging system according to the second aspect of the present disclosure, the server may include a storage device in which a vehicle ID and a DC electric power supply facility ID are registered in association with each other.

In the charging system according to the second aspect of the present disclosure, the first data may include the vehicle ID and an expected departure time, and the controller of the server may be configured to transmit the expected departure time to the DC electric power supply facility registered in association with the vehicle ID when the second data indicates the DC charging.

In the first and second aspects of the present disclosure, the first data is transmitted to the vehicle when the timer charging based on the AC charging is performed. The first data is transmitted to the DC electric power supply facility when the timer charging based on the DC charging is performed. Accordingly, according to the first and second aspects of the present disclosure, the controller of the vehicle can be started at a charging start time when the timer charging based on the AC charging is performed. The controller of the DC electric power supply facility can be started at the charging start time when the timer charging based on the DC charging is performed. Consequently, both of the timer charging based on the AC charging and the timer charging based on the DC charging can be realized.

According to the first and second aspects of the present disclosure, a server that can realize both of the timer charging based on the AC charging and the timer charging based on the DC charging in a vehicle, and a charging system that includes the server can be provided.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
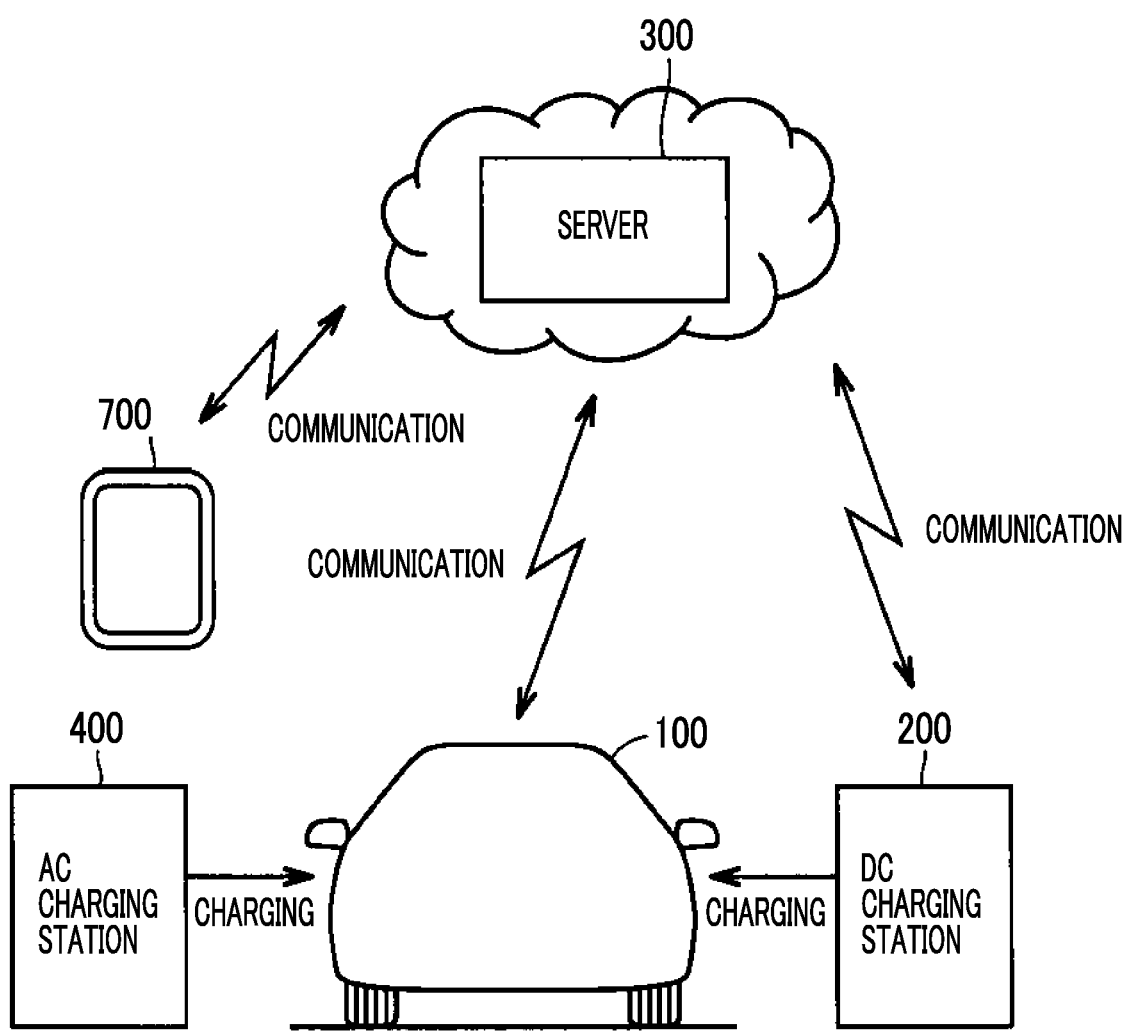
FIG. 1 is a diagram illustrating an overall configuration of a charging system.

Hereinafter, an embodiment will be described in detail with reference to the drawings. The same or corresponding parts in the drawings will be designated with the same reference signs, and descriptions of such parts will not be repeated.

Overall Configuration of Charging System

FIG. 1 is a diagram illustrating an overall configuration of a charging system 1 including a server 300 according to the present embodiment. With reference to FIG. 1, the charging system 1 includes an AC charging station 400, a DC charging station 200, a vehicle 100, a communication terminal 700, and the server 300.

The AC charging station 400 is configured to supply the vehicle 100 with alternating current electric power that is supplied from an alternating current electric power supply (for example, a system electric power supply) outside the AC charging station 400. The DC charging station 200 is configured to convert alternating current electric power supplied from an alternating current electric power supply outside the DC charging station 200 into direct current electric power, and supply the vehicle 100 with the converted direct current electric power.

The vehicle 100 is configured to enable external charging (AC charging) using alternating current electric power supplied from the AC charging station 400, and external charging (DC charging) using direct current electric power supplied from the DC charging station 200. The vehicle 100 is configured to enable timer charging that is external charging executed in accordance with a set time schedule. The vehicle 100 enables timer charging based on AC charging and timer charging based on DC charging. The time schedule in timer charging includes at least a charging start time. In timer charging, external charging is started when the charging start time included in the time schedule is reached.

For example, the communication terminal 700 is configured with a smartphone or a tablet, and is configured to communicate with the server 300. The time schedule in timer charging is determined based on the charging start time or an expected departure time specified by a user. For example, the user inputs the charging start time or the expected departure time through the communication terminal 700. The expected departure time is a time at which the user uses the vehicle 100 for the next time.

The server 300 is configured to communicate with the communication terminal 700 and, for example, receives data indicating the charging start time or the expected departure time from the communication terminal 700. The server 300 is also configured to communicate with the vehicle 100 and the DC charging station 200. As will be described in detail below, the server 300 executes different processes depending on whether timer charging based on AC charging or timer charging based on DC charging is performed in the vehicle 100. Hereinafter, the manner of realizing timer charging based on AC charging and timer charging based on DC charging in the charging system 1 will be described in detail.

Detailed Configuration of Vehicle and Each Charging Station

Figure 2:
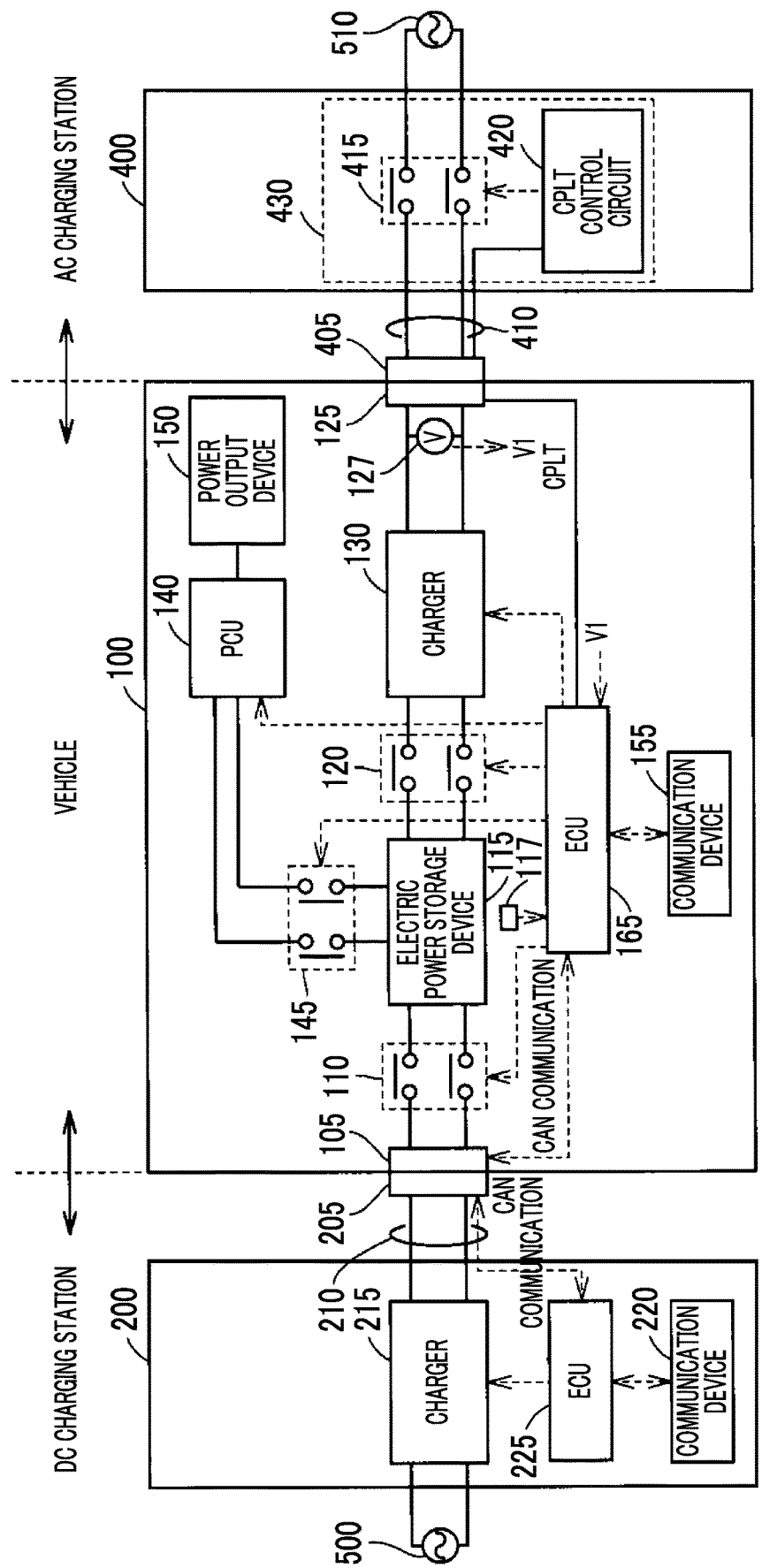
FIG. 2 is a diagram illustrating a detailed configuration of a vehicle, a DC charging station, and an AC charging station.

FIG. 2 is a diagram illustrating a detailed configuration of the vehicle 100, the DC charging station 200, and the AC charging station 400. With reference to FIG. 2, the vehicle 100 is configured to be connected to the DC charging station 200 through a DC charging cable 210, and is configured to be connected to the AC charging station 400 through an AC charging cable 410.

The DC charging station 200 complies with the "CHAdeMO (registered trademark)" standard (hereinafter, referred to as the "CHAdeMO standard"). The CHAdeMO standard is an international standard for quick DC charging. The DC charging station 200 is configured to be supplied with alternating current electric power from an alternating current electric power supply 500 outside the DC charging station 200. The DC charging station 200 includes a charger 215, the DC charging cable 210, a communication device 220, and an electronic control unit (ECU) 225.

The charger 215 is configured to convert alternating current electric power supplied from the alternating current electric power supply 500 into direct current electric power. Direct current electric power converted by the charger 215 is supplied to the vehicle 100 through the DC charging cable 210.

The DC charging cable 210 is an electric power cable for supplying the vehicle 100 with direct current electric power converted by the charger 215. A DC charging connector 205 is disposed at the tip end of the DC charging cable 210. The DC charging connector 205 is configured to be connected to a DC charging inlet 105 (described later) of the vehicle 100.

The communication device 220 is configured to communicate with the server 300 (FIG. 1). As will be described in detail below, the communication device 220 communicates with the server 300 when timer charging based on DC charging is performed in the present embodiment.

The ECU 225 incorporates a central processing unit (CPU) and a memory that are not illustrated. The ECU 225 controls each device of the DC charging station 200 (for example, the charger 215 and the communication device 220) based on information stored in the memory or information from each sensor (not illustrated). The ECU 225 incorporates a timer and thus, can acquire the current time. The ECU 225 stores, in the internal memory, information that indicates the amount of electric power suppliable to the vehicle 100 by the DC charging station 200 (hereinafter, referred to as "suppliable electric power information").

The AC charging station 400 is configured to be supplied with alternating current electric power from an alternating current electric power supply 510 outside the AC charging station 400. The AC charging station 400 includes electric vehicle supply equipment (EVSE) 430 and the AC charging cable 410.

The EVSE 430 is connected to the alternating current electric power supply 510. While the EVSE 430 is disposed in the AC charging station 400, the EVSE 430 may be disposed in the middle of the AC charging cable 410. The EVSE 430 controls supply/cut-off of electric power to the vehicle 100 through the AC charging cable 410 from the alternating current electric power supply 510. For example, the EVSE 430 complies with the United States of America SAE standard "SAE J1772 (SAE Electric Vehicle Conductive Charge Coupler)". For example, the AC charging station 400 has specifications for supplying the vehicle 100 with electric power having a voltage of 100 V, or specifications for supplying the vehicle 100 with electric power having a voltage of 200 V.

The EVSE 430 includes a charging circuit interrupt device (CCID) 415 and a CPLT control circuit 420. The CCID 415 is a relay that is disposed on an electric power supply path to the vehicle 100 from the alternating current electric power supply 510.

The CPLT control circuit 420 generates a pilot signal CPLT that is communicated to an ECU 165 (described later) of the vehicle 100. The CPLT control circuit 420 outputs the generated pilot signal CPLT to the ECU 165 through a dedicated signal line that is included in the AC charging cable 410. The electric potential of the pilot signal CPLT is controlled by the ECU 165. The CPLT control circuit 420 controls the CCID 415 based on the electric potential of the pilot signal CPLT. That is, the ECU 165 can remotely operate the CCID 415 by controlling the electric potential of the pilot signal CPLT.

The AC charging cable 410 is an electric power cable for supplying the vehicle 100 with alternating current electric power supplied from the alternating current electric power supply 510. An AC charging connector 405 is disposed at the tip end of the AC charging cable 410. The AC charging connector 405 is configured to be connected to an AC charging inlet 125 (described later) of the vehicle 100.

The vehicle 100 includes the DC charging inlet 105, the AC charging inlet 125, a voltage sensor 127, a charger 130, an electric power storage device 115, a monitoring unit 117, relays 110, 120, 145, a power control unit (PCU) 140, a power output device 150, a communication device 155, and the ECU 165.

The DC charging inlet 105 is configured to receive connection of the DC charging connector 205 that is disposed in the DC charging cable 210. Direct current electric power is supplied to the vehicle 100 from the DC charging station 200 in a state where the DC charging connector 205 is connected to the DC charging inlet 105.

The AC charging inlet 125 is configured to receive connection of the AC charging connector 405 that is disposed in the AC charging cable 410. Alternating current electric power is supplied to the vehicle 100 from the AC charging station 400 in a state where the AC charging connector 405 is connected to the AC charging inlet 125.

The voltage sensor 127 is configured to detect a voltage that is applied to the AC charging inlet 125 from the AC charging station 400. The detection result of the voltage sensor 127 is output to the ECU 165.

The charger 130 is configured to convert alternating current electric power received by the AC charging inlet 125 into direct current electric power having the charge voltage of the electric power storage device 115. Direct current electric power converted by the charger 130 is supplied to the electric power storage device 115.

The relay 110 is connected between the DC charging inlet 105 and the electric power storage device 115. The relay 120 is connected between the charger 130 and the electric power storage device 115. Opening and closing of the relays 110, 120 are controlled by the ECU 165. When DC charging is performed, the relay 110 is closed, and the relay 120 is open. When AC charging is performed, the relay 120 is closed, and the relay 110 is open.

The electric power storage device 115 is an electric power storage component that is configured to be capable of being charged or discharged. For example, the electric power storage device 115 is configured to include a secondary battery such as a lithium ion battery, a nickel-hydrogen battery, or a lead-acid battery, or an electric power storage element such as an electric double-layer capacitor. When DC charging is performed, the electric power storage device 115 is charged with direct current electric power supplied from the DC charging inlet 105. When AC charging is performed, the electric power storage device 115 is charged with direct current electric power supplied from the charger 130.

The monitoring unit 117 is configured to detect the voltage, the current, and the temperature of the electric power storage device 115. The detection result of the monitoring unit 117 is output to the ECU 165.

The PCU 140 is a general illustration of an electric power conversion device for driving the power output device 150 by receiving electric power from the electric power storage device 115. For example, the PCU 140 includes an inverter for driving a motor included in the power output device 150, a converter for stepping up a direct current voltage supplied to the inverter to or above the voltage of the electric power storage device 115, and the like.

The power output device 150 is a general illustration of a device that outputs power for driving a drive wheel (not illustrated). For example, the power output device 150 includes the motor that drives the drive wheel.

The relay 145 is connected between the PCU 140 and the electric power storage device 115. Opening and closing of the relay 145 are controlled by the ECU 165. The relay 145 is open during DC charging and AC charging.

The communication device 155 is configured to communicate with the server 300 (FIG. 1). As will be described in detail below, the communication device 155 communicates with the server 300 when timer charging based on AC charging is performed in the vehicle 100 according to the present embodiment.

The ECU 165 incorporates a CPU and a memory that are not illustrated. The ECU 165 controls each device of the vehicle 100 (for example, the relays 110, 120, 145, the charger 130, the PCU 140, and the communication device 155) based on information stored in the memory or information from each sensor (not illustrated).

The ECU 165 incorporates a timer and thus, can acquire the current time. For example, the ECU 165 estimates the state of charge (SOC) of the electric power storage device 115 by cumulating the current value in the output of the monitoring unit 117.

For example, the ECU 165 is configured to perform controller area network (CAN) communication with the ECU 225 of the DC charging station 200 through the DC charging cable 210. In the CHAdeMO standard, CAN communication is established between the ECUs 165, 225 after a charging start signal for starting charging is transmitted to the ECU 165 (vehicle 100) from the ECU 225 (DC charging station 200), and DC charging is enabled. That is, in the CHAdeMO standard, the ECU 225 (DC charging station side) can request the ECU 165 (vehicle side) to start DC charging, but the ECU 165 (vehicle side) cannot request the ECU 225 (DC charging station side) to start DC charging.

As described above, the ECU 165 is configured to remotely operate the CCID 415 by controlling the electric potential of the pilot signal CPLT that is communicated through the AC charging cable 410. That is, the ECU 165 (vehicle side) can request the AC charging station 400 to start AC charging. The voltage that is applied to the AC charging inlet 125 from the AC charging station 400 is detected by the voltage sensor 127 after the CCID 415 is closed. The ECU 165 is configured to detect the voltage applied to the AC charging inlet 125 from the AC charging station 400 by receiving the output of the voltage sensor 127.

Configuration of Communication Terminal

Figure 3:
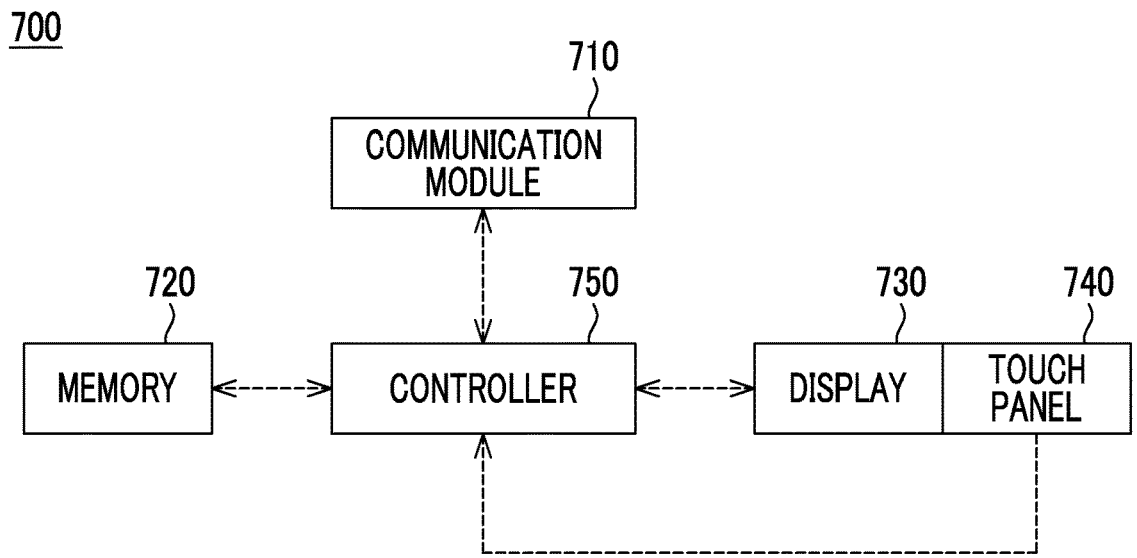
FIG. 3 is a diagram illustrating a configuration of a communication terminal.

FIG. 3 is a diagram illustrating a configuration of the communication terminal 700. With reference to FIG. 3, the communication terminal 700 includes a display 730, a touch panel 740, a communication module 710, a memory 720, and a controller 750.

For example, the display 730 is configured with a liquid crystal display or an organic EL display. For example, the display 730 displays a timer charging setting screen. For example, the timer charging setting screen includes an indication that prompts the user to input either the charging start time or the expected departure time. For example, the timer charging setting screen includes an indication that prompts the user to select either AC charging or DC charging.

The touch panel 740 is disposed on the display 730. The touch panel 740 is configured to receive input from the user. For example, the user can input the charging start time and the like by operating a soft keyboard displayed on the display 730 through the touch panel 740. That is, the touch panel 740 receives an instruction related to timer charging from the user. The data input by the user is output to the controller 750. In the data input by the user, data that indicates the charging start time or the expected departure time (data needed for determining the time schedule in timer charging) will be hereinafter referred to as "first data", and data that indicates which one of AC charging and DC charging is performed will be hereinafter referred to as "second data".

The communication module 710 is configured to communicate with the server 300. For example, the communication module 710 transmits the information input through the touch panel 740 by the user to the server 300.

For example, the memory 720 is configured with a flash memory and stores a control program for the communication terminal 700. The memory 720 stores a vehicle ID of the vehicle 100 that is registered in advance by the user of the vehicle 100. The vehicle ID will be described in detail below.

The controller 750 incorporates a CPU that is not illustrated. The controller 750 controls each device of the communication terminal 700 (for example, the communication module 710, the memory 720, and the display 730) based on information stored in the memory 720 or information from each sensor (not illustrated).

Configuration of Server

Figure 4:
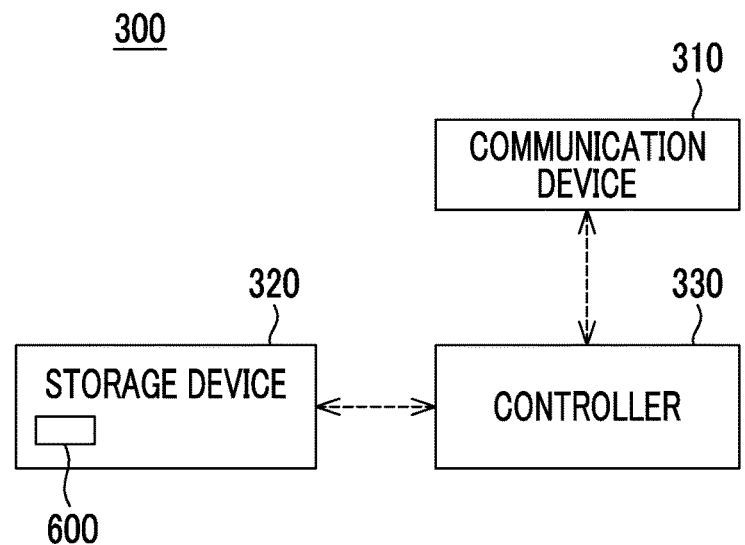
FIG. 4 is a diagram illustrating a configuration of a server.

FIG. 4 is a diagram illustrating a configuration of the server 300. With reference to FIG. 4, the server 300 includes a communication device 310, a storage device 320, and a controller 330.

The communication device 310 is configured to communicate with the communication terminal 700, the vehicle 100, and the DC charging station 200. As will be described in detail below, for example, the communication device 310 receives the first data and the second data from the communication terminal 700 when the user performs an operation for setting timer charging in the communication terminal 700. Then, the communication device 310 communicates with either the vehicle 100 or the DC charging station 200.

The storage device 320 is configured to store a database 600. For example, an association between the vehicle 100 and the DC charging station 200 in a house of the user of the vehicle 100 is registered in the database 600. For example, registration in the database 600 is performed in advance by each vehicle user.

Figure 5:
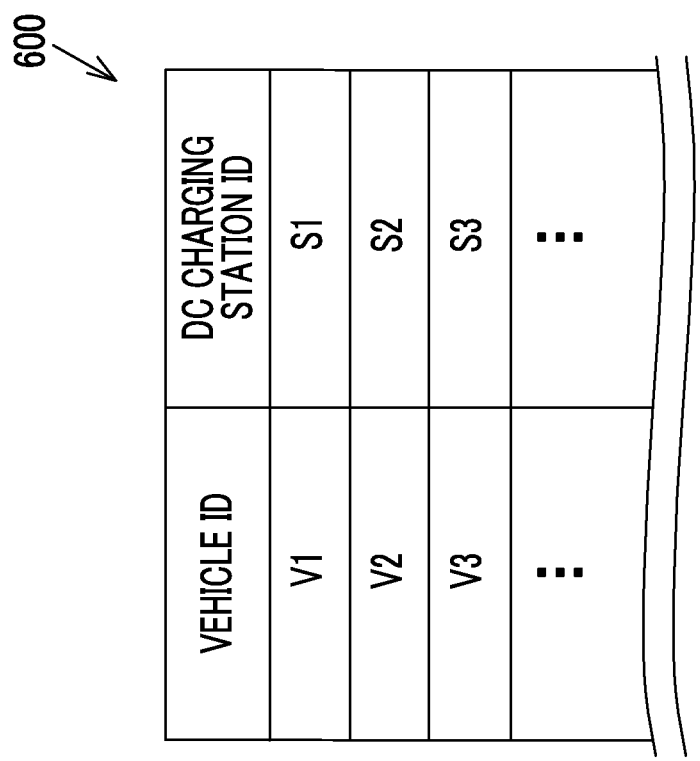
FIG. 5 is a diagram illustrating one example of a database.

FIG. 5 is a diagram illustrating one example of the database 600. With reference to FIG. 5, an association between the vehicle ID and a DC charging station ID is registered in the database 600. An ID is assigned to each vehicle 100 and each DC charging station 200. The controller 330 can determine which DC charging station 200 (DC charging station ID) corresponds to the vehicle 100 (vehicle ID) by referencing the database 600. As described above, the vehicle ID is registered in advance in the communication terminal 700 by the user of the vehicle 100.

With reference to FIG. 4 again, the controller 330 incorporates a CPU and a memory that are not illustrated. The controller 330 executes a process in accordance with a control program that is stored in the memory. For example, when the second data (the data indicating either AC charging or DC charging) received from the communication terminal 700 indicates AC charging, the controller 330 controls the communication device 310 to transmit the first data to the vehicle 100. When the second data received from the communication terminal 700 indicates DC charging, the controller 330 controls the communication device 310 to transmit the first data to the DC charging station 200.

Setting Timer Charging from Communication Terminal

As described above, for example, in AC charging, the charger 130 in the vehicle 100 converts alternating current electric power supplied from the AC charging station 400 into direct current electric power. For example, in DC charging, the charger 215 in the DC charging station 200 converts alternating current electric power supplied from the alternating current electric power supply 500 outside the DC charging station 200 into direct current electric power.

AC charging can be started by the ECU 165 that controls the charger 130 in the vehicle 100 on the vehicle side. Specifically, as described above, the ECU 165 can remotely operate the CCID 415 by controlling the electric potential of the pilot signal CPLT communicated through the AC charging cable 410, and start AC charging by controlling the charger 130.

DC charging can be started by the ECU 225 that controls the charger 215 in the DC charging station 200 on the DC charging station side. Specifically, as described above, the ECU 225 can establish CAN communication between the ECUs 225, 165 by transmitting the charging start signal to the ECU 165 of the vehicle 100, and start DC charging by controlling the charger 215.

As described above, when timer charging is performed, the location of the ECU that should be started in accordance with the time schedule is different between AC charging and DC charging. Specifically, when AC charging is performed, the ECU 165 of the vehicle 100 needs to be started. When DC charging is performed, the ECU 225 of the DC charging station 200 needs to be started. Thus, for example, when the first data and the second data are received from the communication terminal 700, the server 300 should perform different processes for realizing timer charging depending on whether timer charging is performed based on AC charging or DC charging.

In the server 300 according to the present embodiment, when the second data indicates AC charging, the controller 330 controls the communication device 310 to transmit the first data to the vehicle 100. When the second data indicates DC charging, the controller 330 controls the communication device 310 to transmit the first data to the DC charging station 200. Accordingly, when timer charging based on AC charging is performed, the time schedule is set in the vehicle 100. When timer charging based on DC charging is performed, the time schedule is set in the DC charging station 200.

Accordingly, the server 300 can start the ECU 165 of the vehicle 100 at the charging start time when timer charging based on AC charging is performed. The server 300 can start the ECU 225 of the DC charging station 200 at the charging start time when timer charging based on DC charging is performed. Thus, both of timer charging based on AC charging and timer charging based on DC charging can be realized.

Figure 6:
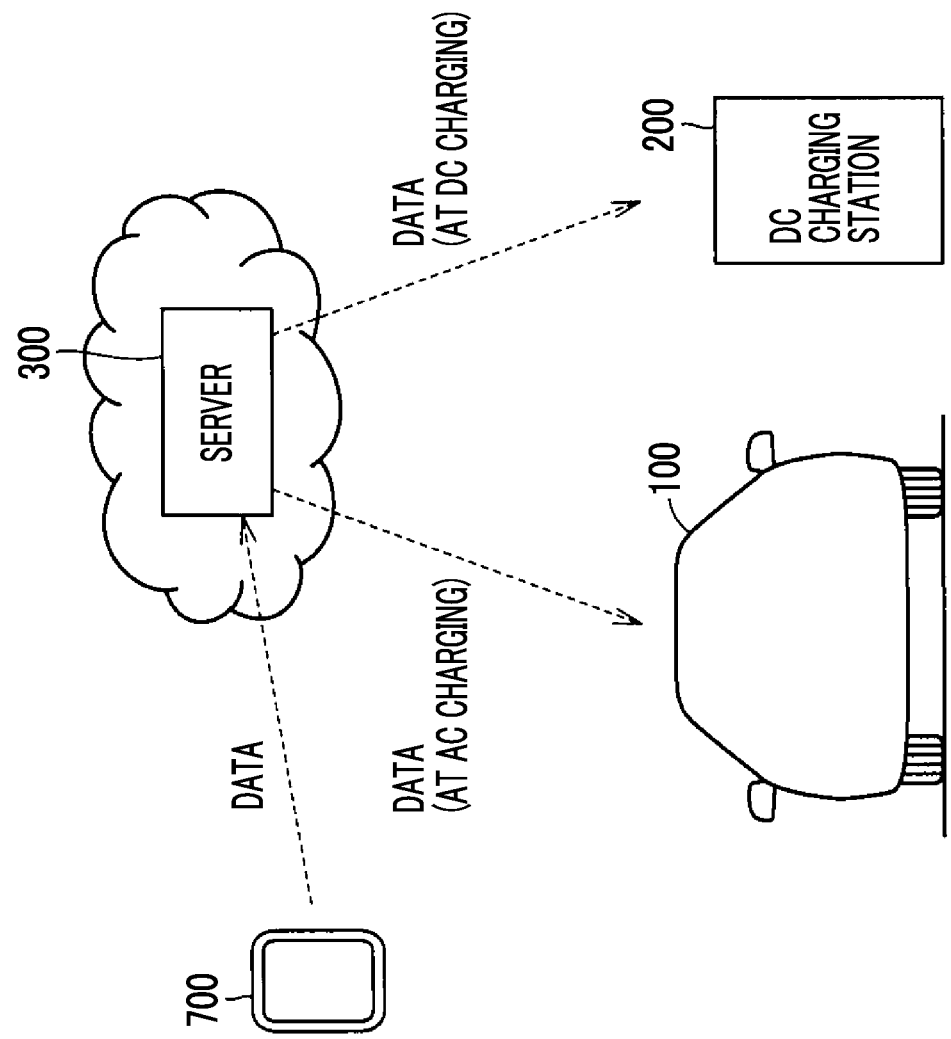
FIG. 6 is a diagram illustrating an image of a procedure of setting a time schedule in each timer charging.

FIG. 6 is a diagram illustrating an image of a procedure of setting the time schedule in each timer charging. With reference to FIG. 6, when the user inputs the first data and the second data through the communication terminal 700, the communication terminal 700 transmits the input first data and the input second data to the server 300.

When the received second data indicates AC charging, the server 300 transmits the received first data (the data indicating the charging start time or the expected departure time) to the vehicle 100. In the vehicle 100, the ECU 165 determines the charging start time based on the received first data. The ECU 165 stores the determined charging start time in the internal memory. Accordingly, setting of the time schedule in timer charging based on AC charging is completed.

When the received second data indicates DC charging, the server 300 transmits the received first data to the DC charging station 200. In the DC charging station 200, the ECU 225 determines the charging start time based on the received first data. The ECU 225 stores the determined charging start time in the internal memory. Accordingly, setting of the time schedule in timer charging based on DC charging is completed.

Accordingly, the server 300 can realize timer charging based on AC charging and timer charging based on DC charging.

Process Procedure of Timer Charging

Figure 7:
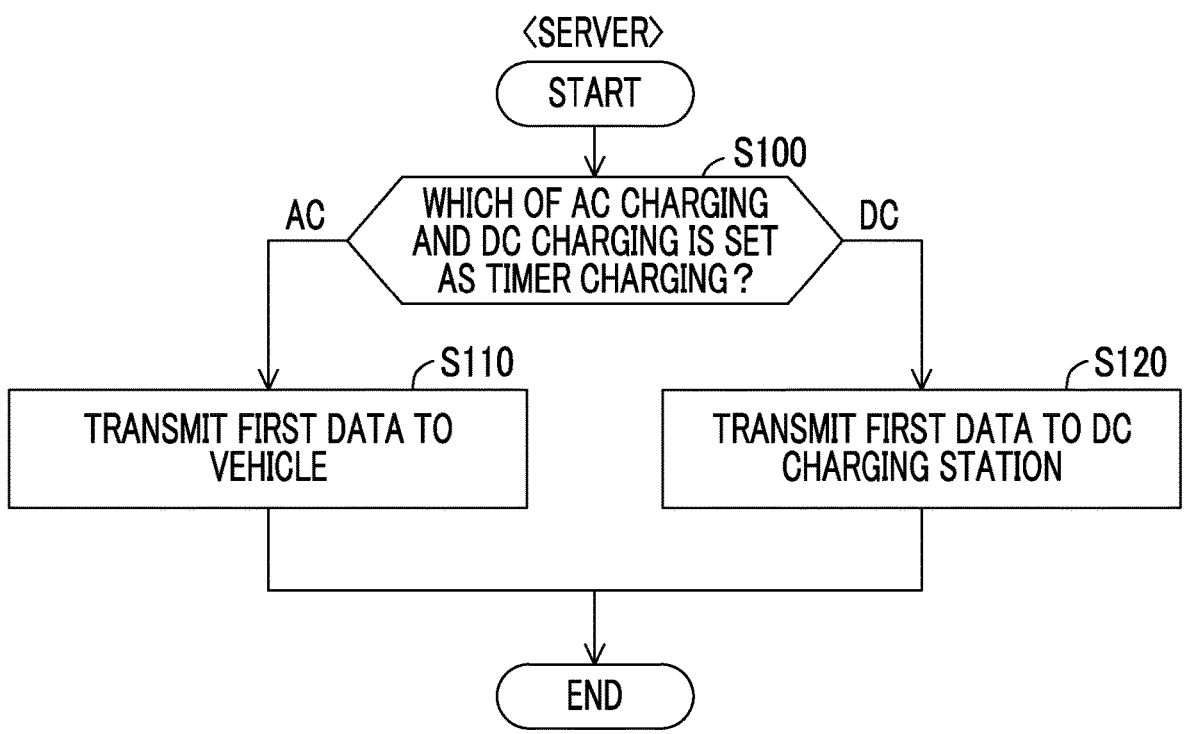
FIG. 7 is a flowchart illustrating a process procedure of timer charging in the server.

FIG. 7 is a flowchart illustrating a process procedure of timer charging in the server 300. The process illustrated in the flowchart in FIG. 7 is executed after the server 300 receives the vehicle ID, the first data, and the second data from the communication terminal 700.

With reference to FIG. 7, the controller 330 determines whether the second data received from the communication terminal 700 indicates AC charging or DC charging (step S100). When the controller 330 determines that the second data indicates AC charging ("AC" in step S100), the controller 330 controls the communication device 310 to transmit the first data to the vehicle 100 indicated by the received vehicle ID (step S110).

When the controller 330 determines that the second data indicates DC charging ("DC" in step S100), the controller 330 controls the communication device 310 to transmit the first data to the DC charging station 200 that is associated with the vehicle ID in the database 600 (step S120).

Processes executed in each of the vehicle 100 and the DC charging station 200 after the reception of the first data will be described in order.

Figure 8:
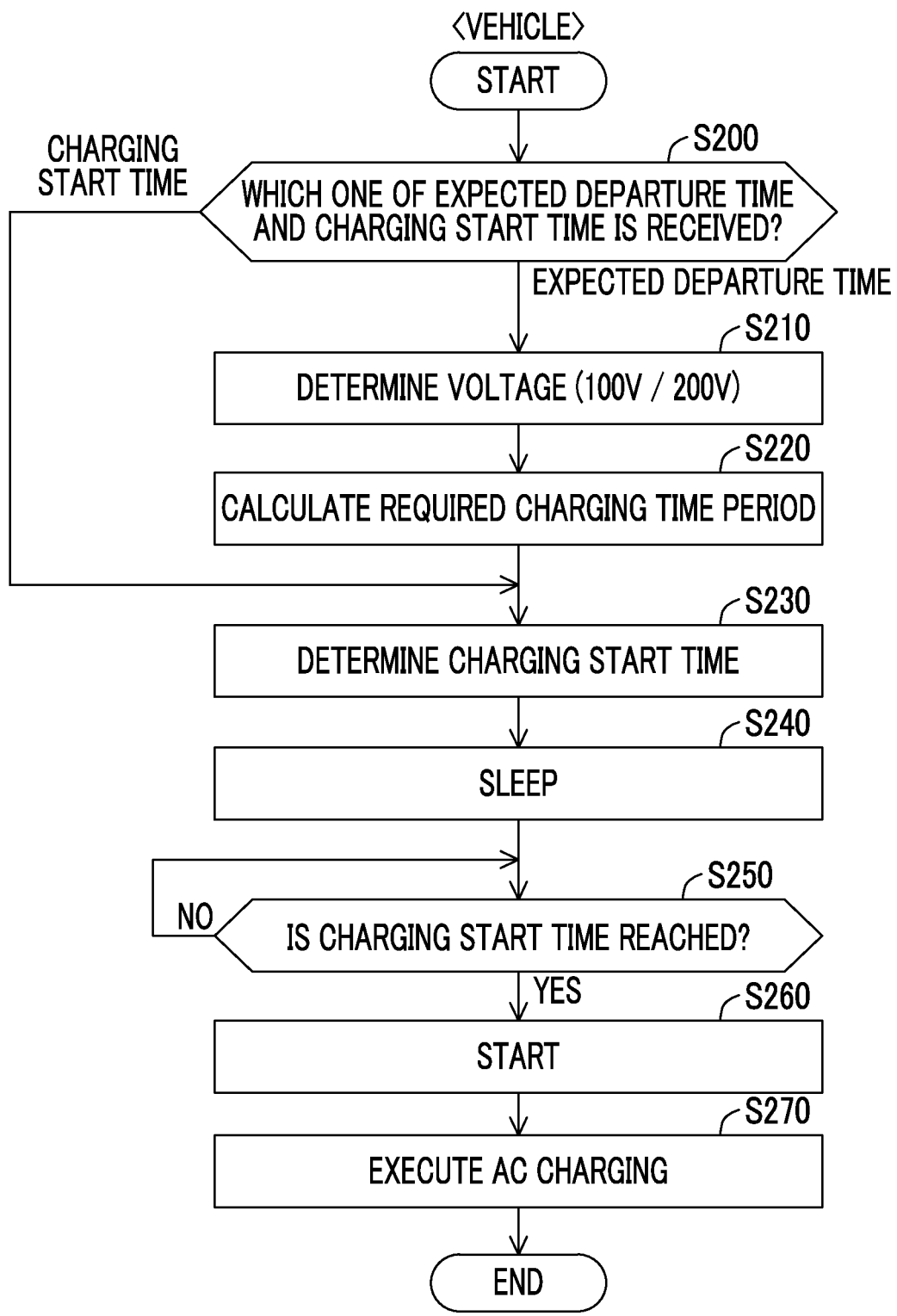
FIG. 8 is a flowchart illustrating a timer charging process based on AC charging.

FIG. 8 is a flowchart illustrating a timer charging process based on AC charging. The process illustrated in the flowchart in FIG. 8 is executed in the vehicle 100 after the first data is received in step S110 in FIG. 7.

With reference to FIG. 8, the ECU 165 determines whether the first data received from the server 300 indicates the expected departure time or the charging start time (step S200). When the ECU 165 determines that the expected departure time is input, the ECU 165 remotely operates the CCID 415 to be closed and determines whether the voltage applied to the AC charging inlet 125 from the AC charging station 400 is 100 V or 200 V by receiving the detection result of the voltage sensor 127 (step S210).

The ECU 165 calculates a time period required for charging the electric power storage device 115 (hereinafter, referred to as a "required charging time period") based on charging electric power derived from the determined charge voltage of the AC charging station 400 and information indicating the state of the electric power storage device 115 (the SOC, the battery temperature, and the like) (step S220). For example, the ECU 165 stores charging electric power (or charge current) for each charge voltage in advance in the internal memory.

After the ECU 165 in step S200 determines that the charging start time is input ("CHARGING START TIME" in step S200), or after the ECU 165 calculates the required charging time period in step S220, the ECU 165 determines the charging start time based on the charging start time received from the server 300 or the calculated required charging time period (step S230).

Then, the ECU 165 transitions to a sleep state (step S240). In the sleep state, main functions of the ECU 165 are stopped, but the function of determining whether or not the charging start time is reached is being operated. The ECU 165 remotely operates the CCID 415 to be opened before transitioning to the sleep state.

In the sleep state, the ECU 165 determines whether or not the charging start time is reached (step S250). When the ECU 165 determines that the charging start time is not reached (NO in step S250), the ECU 165 continues monitoring whether or not the charging start time is reached.

When the ECU 165 determines that the charging start time is reached (YES in step S250), the ECU 165 is started (step S260). That is, the ECU 165 operates the main functions stopped in the sleep state. Then, the ECU 165 executes a process for AC charging (step S270), and the process transitions to END by completion of AC charging. For example, the process for AC charging includes remotely operating the CCID 415 to be closed and controlling the charger 130 to set the charging electric power to be equal to target electric power.

As described above, the timer charging process based on AC charging is completed with merely the vehicle 100 after the first data is received from the server 300. Meanwhile, timer charging based on DC charging is not completed with merely the vehicle 100. Timer charging based on DC charging is realized by cooperation among the vehicle 100, the DC charging station 200, and the server 300.

Figure 9:
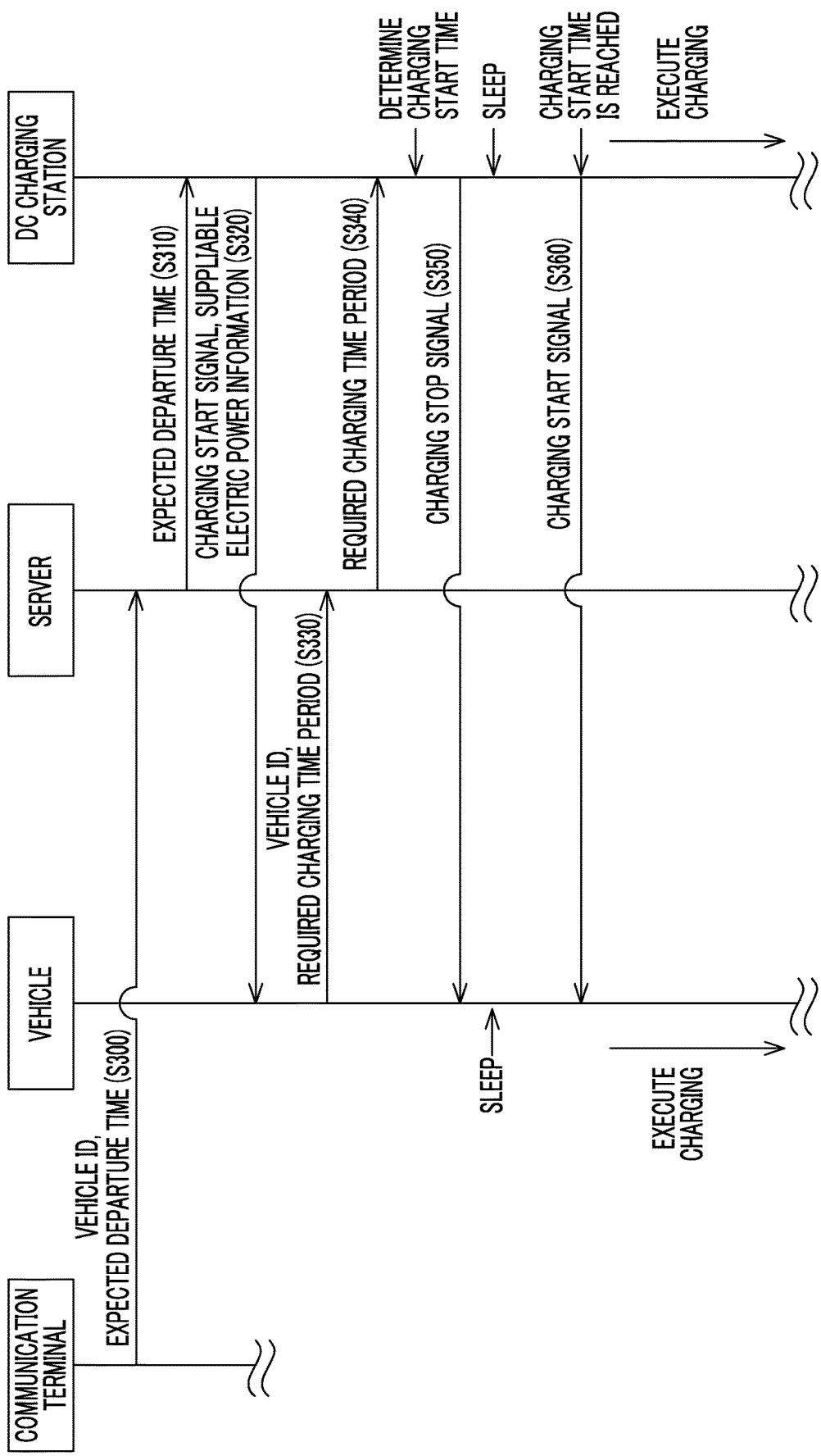
FIG. 9 is a sequence diagram for describing one example of cooperation among the communication terminal, a vehicle, the server, and a DC charging station in a timer charging process based on DC charging.

FIG. 9 is a sequence diagram for describing one example of cooperation among the communication terminal 700, the vehicle 100, the server 300, and the DC charging station 200 in a timer charging process based on DC charging. With reference to FIG. 9, processes of the communication terminal 700, the vehicle 100, the server 300, and the DC charging station 200 are illustrated from left. In the example, it is assumed that the user does not input the charging start time and inputs the expected departure time through the communication terminal 700. It is also assumed that the DC charging connector 205 is connected to the DC charging inlet 105.

In order to realize timer charging based on DC charging, the communication terminal 700 transmits the vehicle ID stored in the memory 720, the expected departure time input by the user, and the data indicating that DC charging is performed (second data) to the server 300 (step S300). The server 300 transmits the received expected departure time to the DC charging station 200 that is associated with the received vehicle ID in the database 600 (FIG. 5) (step S310). When the user inputs the charging start time through the communication terminal 700, the charging start time instead of the expected departure time is transmitted to the DC charging station 200 through steps S300, S310, and the charging start time is determined in the DC charging station 200. Then, the process transitions to step S350.

The DC charging station 200 transmits the charging start signal and the suppliable electric power information to the vehicle 100 through the DC charging cable 210 (step S320). When the vehicle 100 receives the charging start signal, the ECU 165 calculates the required charging time period based on the amount of electric power suppliable by the DC charging station 200, and the vehicle 100 transmits the vehicle ID and the calculated required charging time period to the server 300 (step S330).

The server 300 transmits the received required charging time period to the DC charging station 200 corresponding to the vehicle ID (step S340). In the DC charging station 200, the charging start time is determined based on the received expected departure time and the required charging time period. The DC charging station 200 transmits a charging stop signal to the vehicle 100 (step S350). Accordingly, the DC charging station 200 and the vehicle 100 transition to the sleep state. In the sleep state, main functions of the ECU 225 of the DC charging station 200 are stopped, but the function of monitoring whether or not the charging start time is reached is being operated. In the sleep state, main functions of the ECU 165 of the vehicle 100 are stopped, but the function of monitoring whether or not the charging start signal is received is being operated.

Then, when the charging start time is reached, the ECU 225 is started, and the DC charging station 200 transmits the charging start signal to the vehicle 100 (step S360). When the vehicle 100 receives the charging start signal, the ECU 165 is started, and then, DC charging is started between the vehicle 100 and the DC charging station 200.

As described above, timer charging based on DC charging is realized by cooperation among the communication terminal 700, the vehicle 100, the server 300, and the DC charging station 200. Next, a specific process procedure in each of the DC charging station 200, the vehicle 100, and the server 300 in timer charging based on DC charging will be described.

Figure 10:
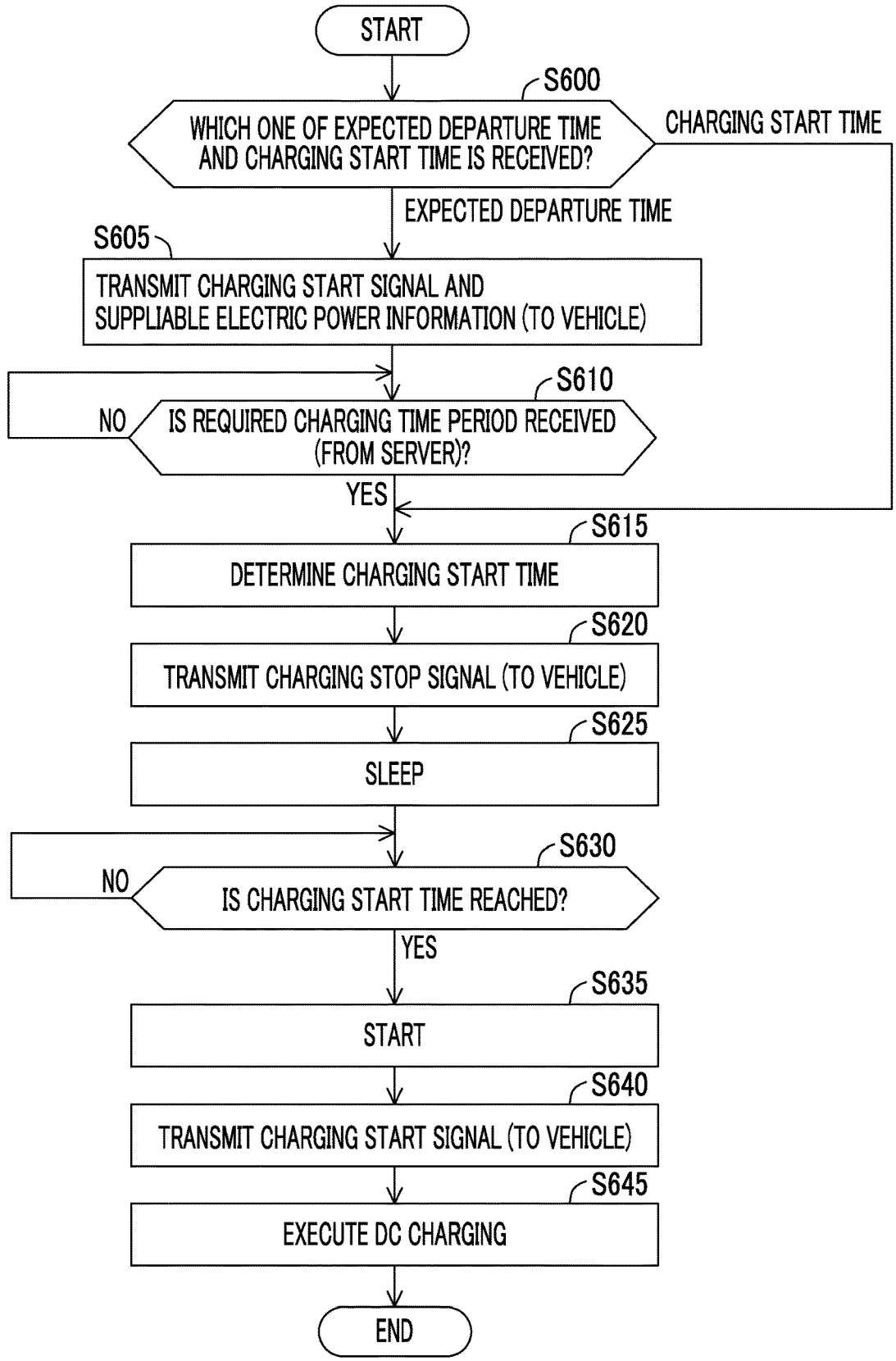
FIG. 10 is a flowchart illustrating a process procedure that is executed in the DC charging station for timer charging based on DC charging.

FIG. 10 is a flowchart illustrating a process procedure that is executed in the DC charging station 200 for timer charging based on DC charging. The process illustrated in the flowchart in FIG. 10 is executed in the DC charging station 200 after the first data (the expected departure time or the charging start time) is received from the server 300.

With reference to FIG. 10, the ECU 225 determines whether the received first data is the expected departure time or the charging start time (step S600). When the ECU 225 determines that the received first data is the expected departure time ("EXPECTED DEPARTURE TIME" in step S600), the ECU 225 establishes CAN communication between the ECUs 225, 165 by transmitting the charging start signal to the ECU 165 through the DC charging cable 210, and transmits the suppliable electric power information to the ECU 165 through the DC charging cable 210 (step S605).

The ECU 225 determines whether or not the required charging time period is received from the server 300 (step S610). When the ECU 225 determines that the required charging time period is not received (NO in step S610), the ECU 225 continues monitoring whether or not the required charging time period is received.

When the ECU 225 in step S610 determines that the required charging time period is received (YES in step S610), or when the ECU 225 in step S600 determines that the first data is the charging start time ("CHARGING START TIME" in step S600), the ECU 225 determines the charging start time based on the received information (step S615).

Then, the ECU 225 transmits the charging stop signal to the vehicle 100 through the DC charging cable 210 (step S620) and transitions to the sleep state (step S625). In the sleep state, main functions of the ECU 225 are stopped, but the function of monitoring whether or not the charging start time is reached is being operated.

In the sleep state, the ECU 225 determines whether or not the charging start time is reached (step S630). When the ECU 225 determines that the charging start time is not reached (NO in step S630), the ECU 225 continues monitoring whether or not the charging start time is reached.

When the ECU 225 determines that the charging start time is reached (YES in step S630), the ECU 225 is started (step S635). That is, the ECU 225 operates the main functions stopped in the sleep state. Then, the ECU 225 transmits the charging start signal to the vehicle 100 (step S640). The ECU 225 executes a process for DC charging (step S645), and the process transitions to END by completion of the DC charging. For example, the process for DC charging that is executed in the DC charging station 200 includes a process of controlling the charger 215 to supply the vehicle 100 with the target electric power indicated by target electric power information transmitted from the vehicle 100.

Figure 11:
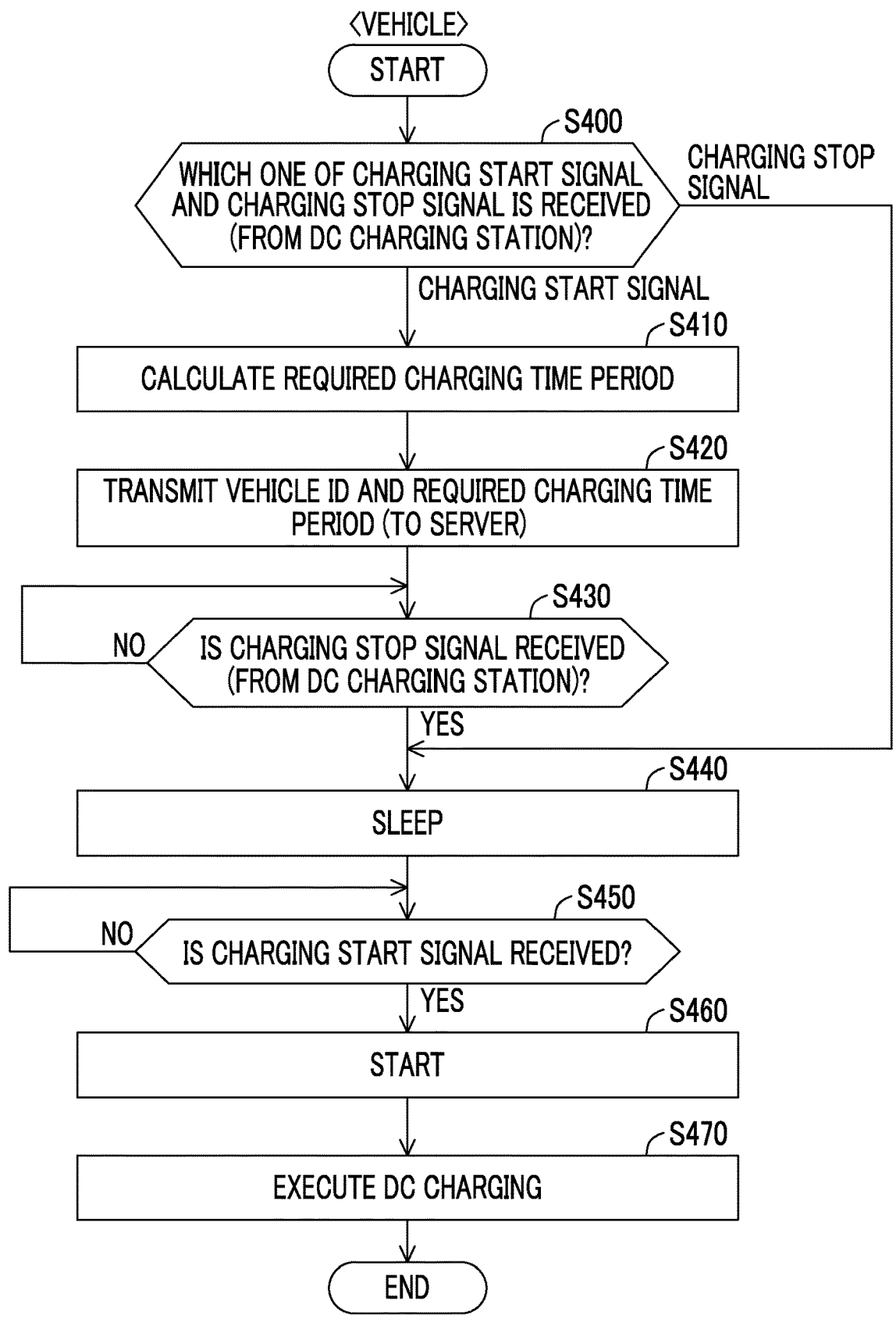
FIG. 11 is a flowchart illustrating a process procedure that is executed in the vehicle for timer charging based on DC charging.

FIG. 11 is a flowchart illustrating a process procedure that is executed in the vehicle 100 for timer charging based on DC charging. The process illustrated in the flowchart in FIG. 11 is executed in the vehicle 100 when either the charging start signal or the charging stop signal is received from the DC charging station 200 after the first data is transmitted to the DC charging station 200 in step S120 in FIG. 7.

With reference to FIG. 11, the ECU 165 determines whether the charging start signal or the charging stop signal is received from the DC charging station 200 (step S400). For example, when the expected departure time is transmitted to the DC charging station 200 from the server 300, the ECU 165 receives the charging start signal and the suppliable electric power information of the DC charging station 200 from the DC charging station 200 (step S320 in FIG. 9). When the charging start time is transmitted to the DC charging station 200 from the server 300, exchange of data for calculating the charging start time can be omitted. Thus, the ECU 165 receives the charging stop signal from the DC charging station 200 (corresponds to step S350 in FIG. 9).

When the ECU 165 determines that the charging start signal is received ("CHARGING START SIGNAL" in step S400), the ECU 165 calculates the required charging time period based on the charging start signal, the received suppliable electric power information of the DC charging station 200, and information indicating the state of the electric power storage device 115 (the SOC, the battery temperature, and the like) (step S410). Then, the ECU 165 controls the communication device 155 to transmit the vehicle ID and the calculated required charging time period to the server 300 (step S420).

When the required charging time period is transmitted to the server 300, the ECU 165 monitors whether or not the charging stop signal is received from the DC charging station 200 (step S430). When the ECU 165 confirms that the charging stop signal is not received (NO in step S430), the ECU 165 continues monitoring whether or not the charging stop signal is received.

When the ECU 165 confirms that the charging stop signal is received (YES in step S430), the ECU 165 transitions to the sleep state (step S440). In the sleep state, main functions of the ECU 165 are stopped, but the function of monitoring whether or not the charging start signal is received is being operated.

In the sleep state, the ECU 165 monitors whether or not the charging start signal is received (step S450). When the ECU 165 confirms that the charging start signal is not received (NO in step S450), the ECU 165 continues monitoring whether or not the charging start signal is received.

When the ECU 165 confirms that the charging start signal is received (YES in step S450), the ECU 165 is started (step S460). That is, the ECU 165 operates the main functions stopped in the sleep state. Then, the ECU 165 executes a process for DC charging (step S470), and the process transitions to END by completion of DC charging. For example, the process for DC charging includes a process of closing the relay 110 and a process of transmitting target electric power information to the ECU 225 by CAN communication.

Figure 12:
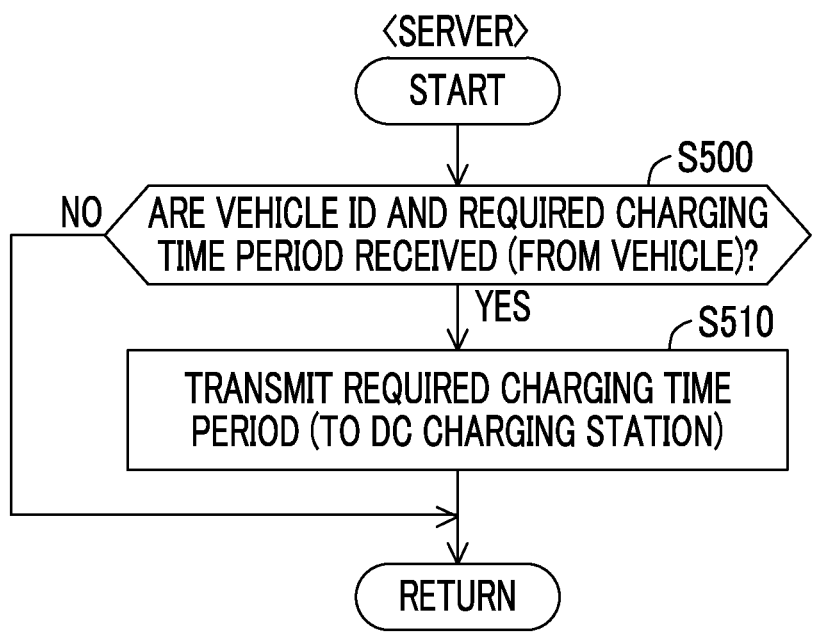
FIG. 12 is a flowchart illustrating a process procedure that is executed in the server for timer charging based on DC charging.

FIG. 12 is a flowchart illustrating a process procedure that is executed in the server 300 for timer charging based on DC charging. The process illustrated in the flowchart in FIG. 12 is executed at predetermined cycles in the server 300 after step S120 in FIG. 7 is executed.

With reference to FIG. 12, the controller 330 determines whether or not the vehicle ID and the required charging time period are received from the vehicle 100 (step S500). When the controller 330 determines that the vehicle ID and the required charging time period are received (YES in step S500), the controller 330 controls the communication device 310 to transmit the received required charging time period to the DC charging station 200 corresponding to the vehicle ID (step S510). When the controller 330 in step S500 determines that the vehicle ID and the required charging time period are not received (NO in step S500), or when the required charging time period is transmitted to the DC charging station 200 in step S510, the process transitions to RETURN.

As described heretofore, in the server 300 according to the present embodiment, when the first data and the second data are received from the communication terminal 700, and the second data indicates AC charging, the controller 330 controls the communication device 310 to transmit the first data to the vehicle 100. When the second data indicates DC charging, the controller 330 controls the communication device 310 to transmit the first data to the DC charging station 200. The server 300 can start the ECU 165 of the vehicle 100 at the charging start time when timer charging based on AC charging is performed. The server 300 can start the ECU 225 of the DC charging station 200 at the charging start time when timer charging based on DC charging is performed. Thus, both of timer charging based on AC charging and timer charging based on DC charging can be realized.

First Modification Example

In the present embodiment, the user provides input as to whether to perform AC charging or DC charging through the communication terminal 700. However, the input as to whether to perform AC charging or DC charging does not need to be provided by the user through the communication terminal 700. In a first modification example of the present embodiment, a determination as to whether to perform AC charging or DC charging is automatically made without the user providing input as to whether to perform AC charging or DC charging through the communication terminal 700.

Figure 13:
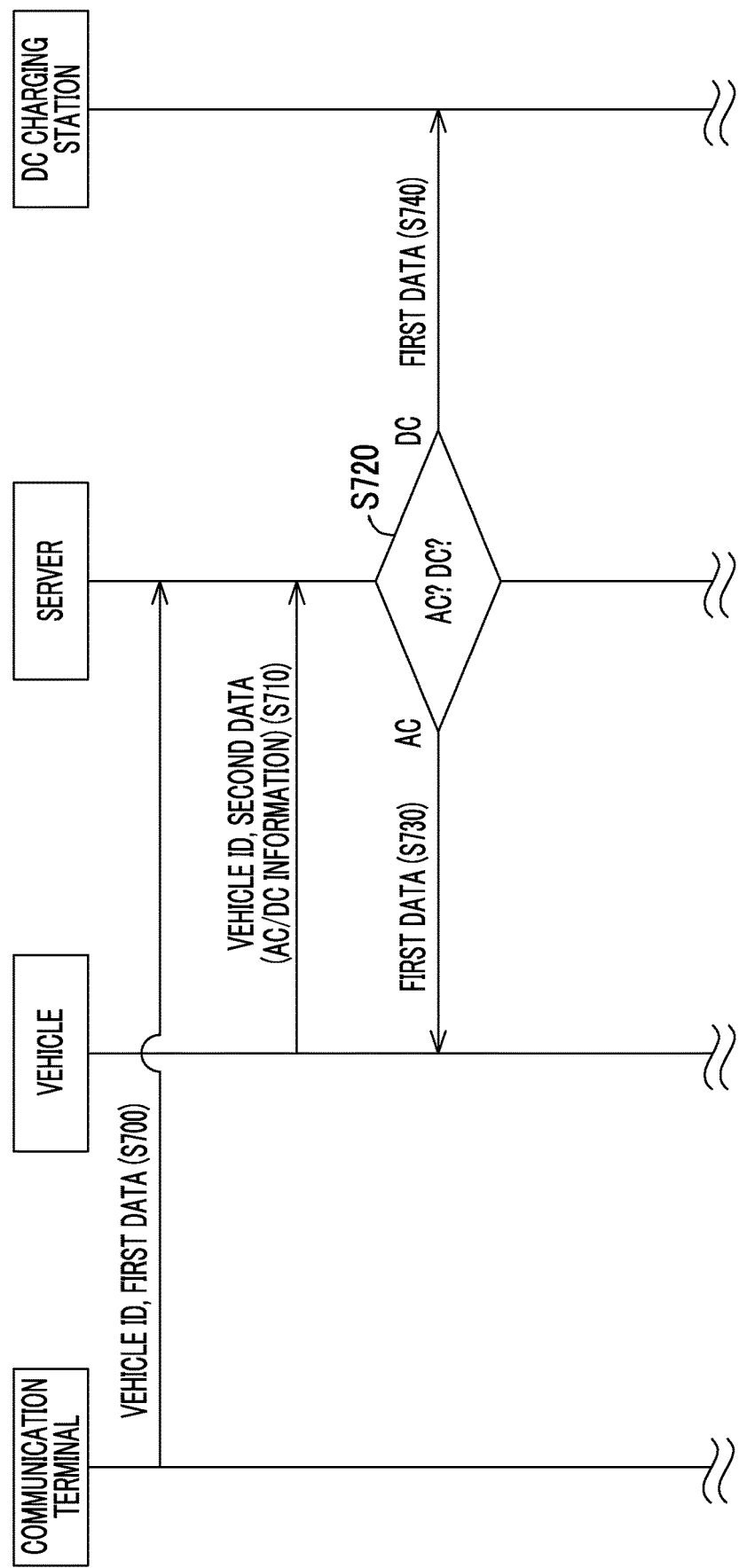
FIG. 13 is a sequence diagram for describing one example of cooperation among a communication terminal, a vehicle, a server, and a DC charging station in a timer charging process based on DC charging in a first modification example.

FIG. 13 is a sequence diagram for describing one example of cooperation among the communication terminal 700, the vehicle 100, the server 300, and the DC charging station 200 in a timer charging process based on DC charging in the first modification example. With reference to FIG. 13, processes of the communication terminal 700, the vehicle 100, the server 300, and the DC charging station 200 are illustrated from left.

The user inputs the expected departure time or the charging start time through the communication terminal 700. In the present modification example, the user does not provide input as to whether to perform AC charging or DC charging through the communication terminal 700. The communication terminal 700 transmits the input expected departure time or the charging start time (first data) to the server 300 (step S700).

When AC charging is performed, the user connects the AC charging connector 405 to the AC charging inlet 125. When DC charging is performed, the user connects the DC charging connector 205 to the DC charging inlet 105. In the vehicle 100, the ECU 165 can detect connection of either the AC charging connector 405 or the DC charging connector 205. The vehicle 100 transmits information indicating connection of either the AC charging connector 405 or the DC charging connector 205 (second data) to the server 300 (step S710). That is, in the present modification example, the user's action of connecting the AC charging connector 405 or the user's action of connecting the DC charging connector 205 is a part of the instruction related to timer charging from the user. The process of step S700 and the process of step S710 do not need to be executed in such an order. For example, the process of step S710 may be executed first, and then, the process of step S700 may be executed.

In the server 300, the controller 330 determines whether the second data indicates AC charging or DC charging (step S720). When the controller 330 determines that the second data indicates AC charging ("AC" in step S720), the server 300 transmits the first data received from the communication terminal 700 to the vehicle 100 (step S730).

When the controller 330 determines that the second data indicates DC charging ("DC" in step S720), the server 300 transmits the first data received from the communication terminal 700 to the DC charging station 200 (step S740).

For example, processes after step S730 are the same as the processes illustrated in the flowchart in FIG. 8. For example, processes after step S740 are the same as the processes illustrated in the flowcharts in FIG. 10 to FIG. 12.

As described heretofore, the server 300 according to the first modification example receives the first data from the communication terminal 700 and receives the second data from the vehicle 100. Accordingly, the server 300 can realize appropriate timer charging without the user providing input as to whether to perform AC charging or DC charging into the communication terminal 700.

Second Modification Example

In the present embodiment, the communication terminal 700 transmits the vehicle ID to the server 300, and the server 300 specifies the DC charging station 200 associated with the vehicle ID (by referencing the database 600 (FIG. 4)). However, the method of specifying the DC charging station 200 used by the user of the vehicle 100 is not limited thereto. For example, not only the vehicle 100 but also the DC charging station 200 used by the user may be registered in advance in the communication terminal 700. The communication terminal 700 may transmit the information of the vehicle 100 and the DC charging station 200 to the server 300, and the server 300 may specify the vehicle 100 and the DC charging station 200 of the user in accordance with the received information.

The embodiment disclosed herein is for illustrative purposes from every point of view and should not be considered restrictive. The scope of the present disclosure is not disclosed by the description and is disclosed by the claims, and is intended to include all changes made within the equivalent meaning and scope of the claims.

What is claimed is:

1. A server configured to receive an instruction related to timer charging in a vehicle from a user, the server comprising:
 a communication device configured to communicate with the vehicle and a direct current electric power supply facility as an electric power supply; and
 a controller configured to control the communication device, wherein:
 the timer charging is external charging that is executed in accordance with a time schedule;
 the external charging is charging of a vehicle-mounted electric power storage device using electric power supplied from an electric power supply outside the vehicle;
 the vehicle is configured to enable both of alternating current charging that is the external charging using alternating current electric power supplied from an alternating current electric power supply facility as the electric power supply, and direct current charging that is the external charging using direct current electric power supplied from the direct current electric power supply facility;

the instruction from the user includes first data needed for determining the time schedule and second data indicating which one of the alternating current charging and the direct current charging is performed; and the controller is configured to
  control the communication device to transmit the first data to the vehicle when the second data indicates the alternating current charging, and
  control the communication device to transmit the first data to the direct current electric power supply facility when the second data indicates the direct current charging.

2. The server according to claim 1, wherein:
the communication device is configured to communicate with a communication terminal into which the user inputs the instruction; and
the server is configured to receive both of the first data and the second data from the communication terminal.

3. The server according to claim 1, wherein:
the communication device is configured to communicate with a communication terminal into which the user inputs the instruction; and
the server is configured to receive the first data from the communication terminal, and receive the second data from the vehicle.

4. The server according to claim 1, further comprising a storage device in which a vehicle identification and a direct current electric power supply facility identification are registered in association with each other.

5. The server according to claim 4, wherein:
the first data includes the vehicle identification and an expected departure time; and
the controller is configured to transmit the expected departure time to the direct current electric power supply facility registered in association with the vehicle identification when the second data indicates the direct current charging.

6. A charging system comprising:
a vehicle;
a direct current electric power supply facility configured to supply direct current electric power to the vehicle; and
a server configured to receive an instruction related to timer charging in the vehicle from a user, the server including a communication device configured to communicate with the vehicle and the direct current electric power supply facility, and a controller configured to control the communication device, wherein:
the timer charging is external charging that is executed in accordance with a time schedule;
the external charging is charging of a vehicle-mounted electric power storage device using electric power supplied from an electric power supply outside the vehicle;
the vehicle is configured to enable both of alternating current charging that is the external charging using alternating current electric power supplied from an alternating current electric power supply facility as the electric power supply, and direct current charging that is the external charging using direct current electric power supplied from the direct current electric power supply facility;
the instruction from the user includes first data needed for determining the time schedule and second data indicating which one of the alternating current charging and the direct current charging is performed; and
the controller of the server is configured to control the communication device to transmit the first data to the vehicle when the second data indicates the alternating current charging, and control the communication device to transmit the first data to the direct current electric power supply facility when the second data indicates the direct current charging.

7. The charging system according to claim 6, wherein:
the communication device is configured to communicate with a communication terminal into which the user inputs the instruction; and
the server is configured to receive both of the first data and the second data from the communication terminal.

8. The charging system according to claim 6, wherein:
the communication device is configured to communicate with a communication terminal into which the user inputs the instruction; and
the server is configured to receive the first data from the communication terminal, and receive the second data from the vehicle.

9. The charging system according to claim 6, wherein the server includes a storage device in which a vehicle identification and a direct current electric power supply facility identification are registered in association with each other.

10. The charging system according to claim 9, wherein:
the first data includes the vehicle identification and an expected departure time; and
the controller of the server is configured to transmit the expected departure time to the direct current electric power supply facility registered in association with the vehicle identification when the second data indicates the direct current charging.

* * * * *